United States Patent [19]
Ferre-Blanquez

[11] Patent Number: 4,880,256
[45] Date of Patent: Nov. 14, 1989

[54] TEXTILE LABEL

[76] Inventor: Juan Ferre-Blanquez, Guifre 572-576, 08912 Barcelona, Spain

[21] Appl. No.: 325,063

[22] Filed: Mar. 14, 1989

Related U.S. Application Data

[62] Division of Ser. No. 100,932, Sep. 25, 1987, abandoned.

[30] Foreign Application Priority Data

Nov. 12, 1986 [ES] Spain .................................. 86-01308

[51] Int. Cl.[4] ........................ B42D 15/00; B42D 9/00; G09C 1/00

[52] U.S. Cl. ........................................ 283/92; 283/73; 283/81

[58] Field of Search ....................... 283/21, 73, 74, 81, 283/91, 98; 156/DIG. 19; D5/63; 112/278

[56] References Cited

U.S. PATENT DOCUMENTS

| | | | |
|---|---|---|---|
| 734,077 | 7/1903 | Mann et al. | 283/73 |
| 4,235,459 | 11/1980 | Callahan | 283/81 |
| 4,397,142 | 8/1983 | Bingham | 283/81 |
| 4,500,116 | 2/1985 | Ferro et al. | 283/92 |
| 4,506,916 | 3/1985 | Kuhl | 283/73 |
| 4,609,207 | 9/1986 | Muck et al. | 283/91 |
| 4,682,794 | 7/1987 | Margolin | 283/91 |

*Primary Examiner*—Frank T. Yost
*Assistant Examiner*—Paul M. Hayrana, Sr.
*Attorney, Agent, or Firm*—Lackenbach, Siegel, Marzullo & Aronson

[57] ABSTRACT

A textile label, that is destinated to be applied to several different types of products, such as clothing, or to any other article, in order to distinguish the corresponding products. It is possible to quickly obtain a showing, without any light being required, or even in total darkness, of many details of interest to the buyer or to the user of the product. Characteristically, the textile label is made in the manner of a textile substrate, having incorporated therein at least one phosphorescent thread that forms one or more embroideries. This thread can readily be seen from the top surface or from the bottom surface of the label. The textile label provides quick and easy control over the origin and quality of a highly recognized distinguished product to which it is attached, preventing its total falsification by anyone.

3 Claims, 1 Drawing Sheet

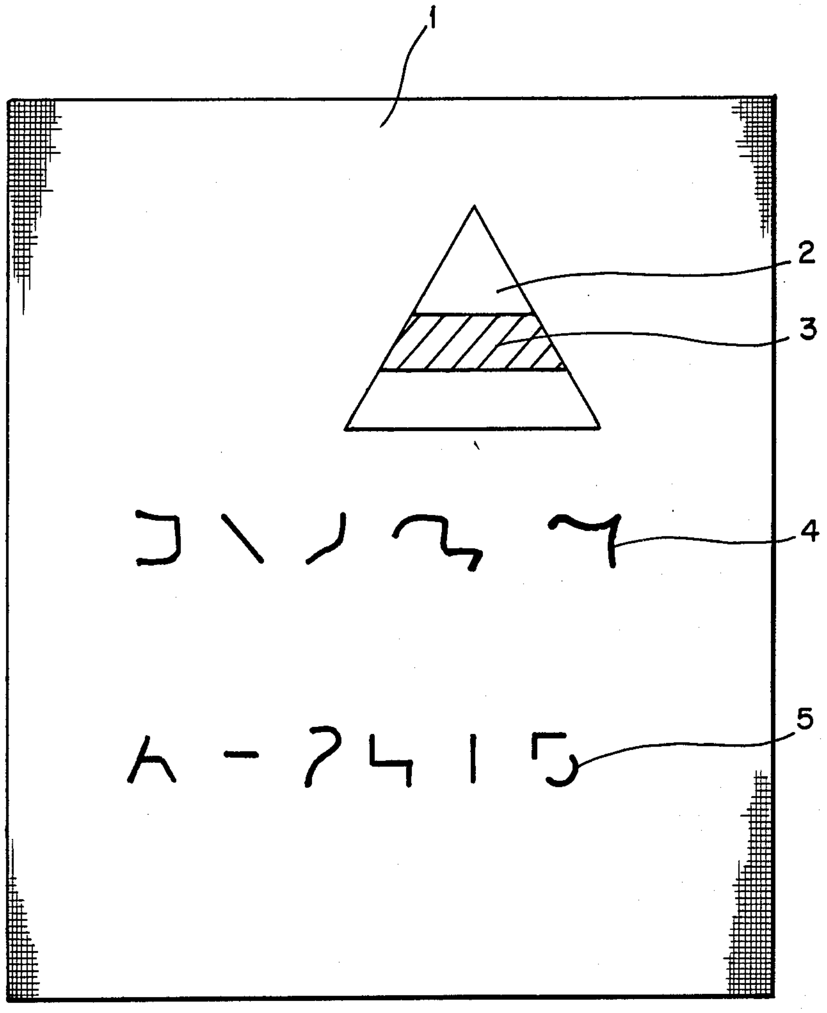
1
2
3
4
5

TEXTILE LABEL

This application is a division of application Ser. No. 100,932, filed 9-25-87, abandoned.

The present invention has as an object to provide a textile label construction. The function for which it is utilized, and several advantages thereof will be described later on, besides other inherent features.

Textile labels are already known that identify products and other diverse articles, along with the manufacturer's marks or similar marks for indicating the quality and/or instructions for the use of the corresponding product to which they are applied.

The mentioned textile label is fixed to the respective product in a manner based upon the nature of this product, for example by being sewn, by adhesive or by other conventional ways.

Based upon the information contained in the prior art label, it is not possible to warranty the authenticity nor the origin of the product, nor the quality of the product to which the label is applied. It is not readily possible that the user can easily verify if such labels have been falsified.

To solve this problem and the inconvenience it has caused, it has been suggested to use the textile label of the present invention, whose construction is characterized by having the textile base incorporate at least one phosphorescent thread that is formed into one or more embroideries, or patterns, or shaped configurations in the said support.

This new textile label has the advantages of providing a warranty for the origin and quality of the product that it identifies, so as to warranty also the authenticity of the product so labeled with respect to the important purpose of preventing falsification of the product. The label also creates a feeling of security in the trademark chosen by the purchaser and of confidence in the purchased product. There can easily be an eventual testing and assurance by the manufacturers of the high quality distinguished products to which the textile label of the invention can be attached, regarding their distributors to prevent possible imitations or falsifications. Everything will be properly controlled by using a highly recognized trademark with the indicated labels. Furthermore, the construction of the new textile label is unique and includes an original design within the said label. This is to promote an increase in the label's power to identify and to be perceived at low light levels or to be perceived in total darkness. This unique feature is due to the embroideries of the phosphorescent threads, because they can be seen at low light level or perceived in the dark. Thus the product label of the invention promotes identification by any possible buyer of the highly recognized and distinct product or article.

The substrate of the textile label of the invention can be made according to any conventional textile method, then it has added to its construction one or more phosphorescent threads that are formed into one or more embroideries or design patterns on the textile substrate of the label. These embroideries are obtained by conventional textile stitching procedures.

The textile label according to the present invention has the advantages that were described above, plus others that can be readily observed from the detailed discussion of preparing the mentioned label. This provides an understanding of the characteristics previously explained, by simultaneously providing knowledge about the several details which accompany the present invention. For such a purpose, a drawing is provided only as sample and is not to limit the scope of this invention, since it represents a practical example of the textile label of the invention.

In the drawing, the FIGURE only represents schematically an enlargement of a textile label as seen from its exterior face.

The textile label that is represented in the present embodiment represents a textile base or substrate -1- made as per a conventional textile procedure, and in this case is, rectangular in shape, although it could be square, polygonal, straight or with curved sides and also could be of a configuration that is totally curved, such as a circle or oval, etc. For example, any geometrical configuration could be adopted, particularly a configuration suitable for the kind of product to which the label applied. The application could be to sporting equipment, to textiles or other clothing materials, bottled liquids such as wine and liquors, toys, jewelry, food and in general some products that it may be of interest to distinguish by using the mentioned label, for the purpose of assuring the origin, warranty, quality and authenticity, already previously discussed.

The mentioned textile substrate or base -1-incorporates at least one phosphorescent thread that can be formed into several embroideries Logotypes integrated by the embroideries -2- and -3-, in this example, are of two different colors so that it gives a relief to the said logotype. Other embroidery -4- provides characters, such as letters, with one or more phosphorescent threads of one color that could be distinguished over the color of the background of the support -1-. The other embroidery -5- can create other characters, such as letters and numbers at the same time, formed by one or more phosphorescent threads of the same or different colors, that could be distinguished from the background color of the textile support -1-.

Evidently, on this textile support, there could exist one or more embroideries with the required instructions for proper use of the product to which this textile label is applied. The label will have the adequate size for the purpose that it is used.

Accordingly the visible textile label will be able to present one or more embroideries containing conventional threads to which there is added the phosphorescent threads which will be able to show diverse colors included there in same label, as may be required.

It is also possible to obtain the described textile label, conventionally, starting from a strip of textile labels that have been separated by cutting.

Attachment of the textile label to the product can be made by known mediums and according to the usual methods, for obtaining its attachment to the corresponding product to which it may be applied.

The phosphorescent thread employed for forming the embroideries on the textile label of the present invention, emits visible light produced by a known excitation device. The visible light emission persists after such excitation has ceased. The greater the excitation of the thread, the longer the visible light persists thereafter due to photic radiations of sun light or artificial light. In addition it is possible to obtain the necessary excitation by radiation at low light levels or from radiation not visible to the human eye, and produced by known devices.

In any case, the results obtained for the phosphorescency is that it is visible to the user and for the eventual buyer of a product to see, such that it can distinguish the mentioned textile label. This provides to the purchaser of such product the security of its origin and quality determinated by the existing embroideries -2-, -3-, -4- and -5- or any other ones attained by one or more phosphorescent threads. Also it increases the identification power of such a textile label, and it can be perceived with little light or can be perceived even in darkness by the buyer or the user of such a product. It is also an important feature of the label of the invention that it offers to the user, a highly visible location wherein it has been placed, and from which it can be located readily with no mistake.

It must be born in mind, in using the label of the present invention, that it could be applied in all the variations that practical experience can advise, concerning shapes and dimensions, number of integrated pieces, materials used in the same and further accessory circumstances, so that it could be introduced in many modifications that result consistent with the essential results, since it remains all included in the spirit of following claims.

I claim:

1. A textile label for identifying textile goods or garments having incorporated therein a stitched logotype consisting of words, numbers, geometrical shapes, or symbolic figures, said logotype consisting of at least one phosphorescent thread, whereby the source and nature of the goods or garments may be authenticated.

2. A textile label as in claim 1, wherein the phosphorescent thread comprises a plurality of colors.

3. A textile label as in claim 1, wherein the design communicates information selected from the group consisting of fiber content of the textile, care of the goods or garments, and a combination thereof.

* * * * *